Figure 4:
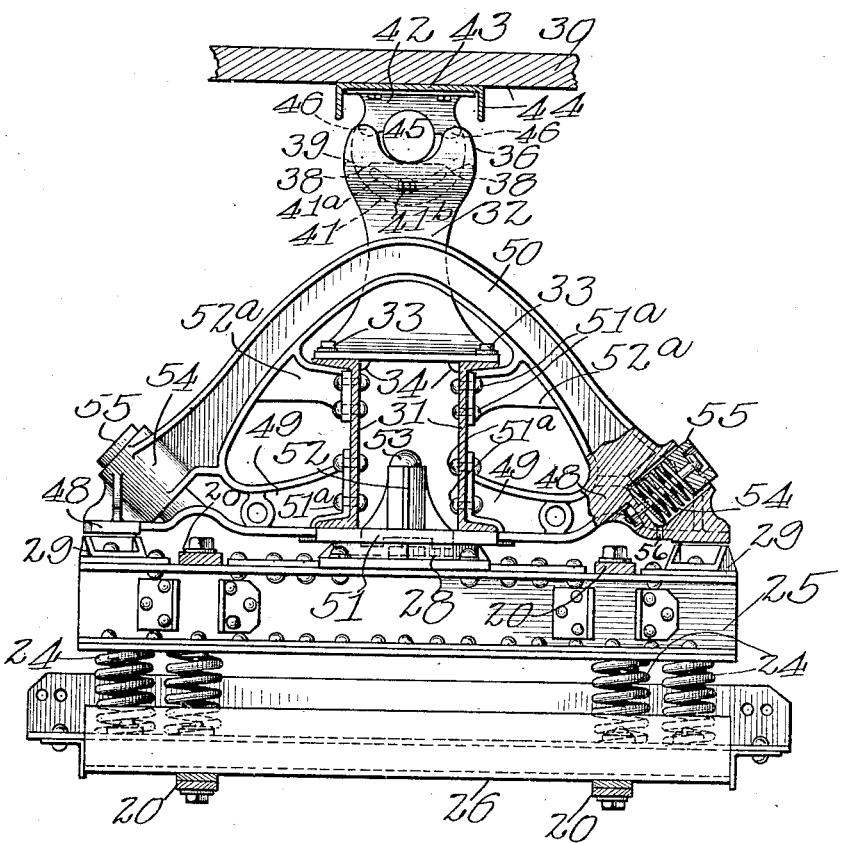

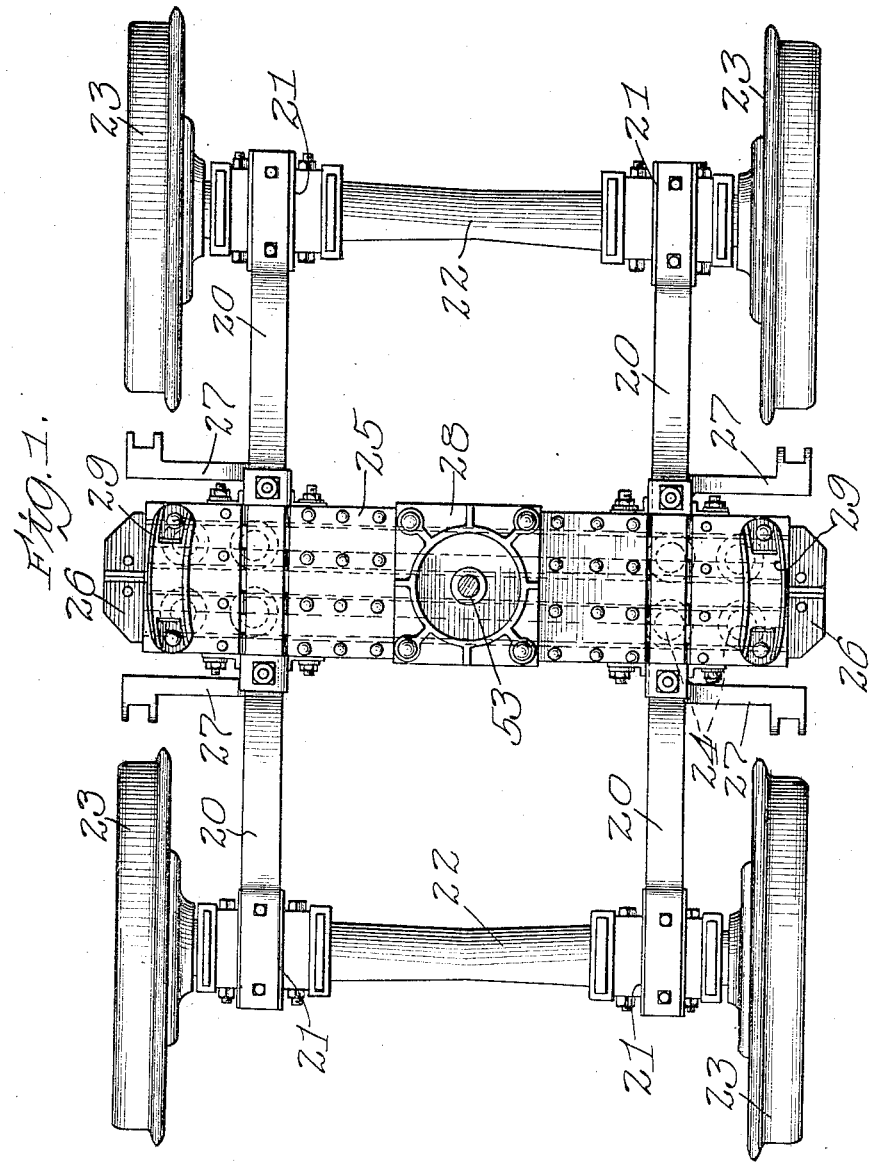

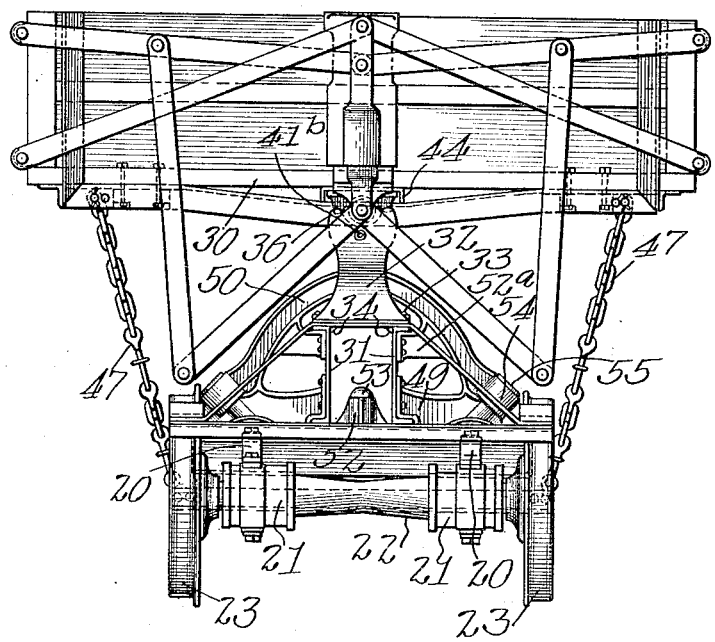

H. GREER, Jr.
DUMPING CAR.
APPLICATION FILED AUG. 9, 1912.

1,125,307.

Patented Jan. 19, 1915.
4 SHEETS—SHEET 3.

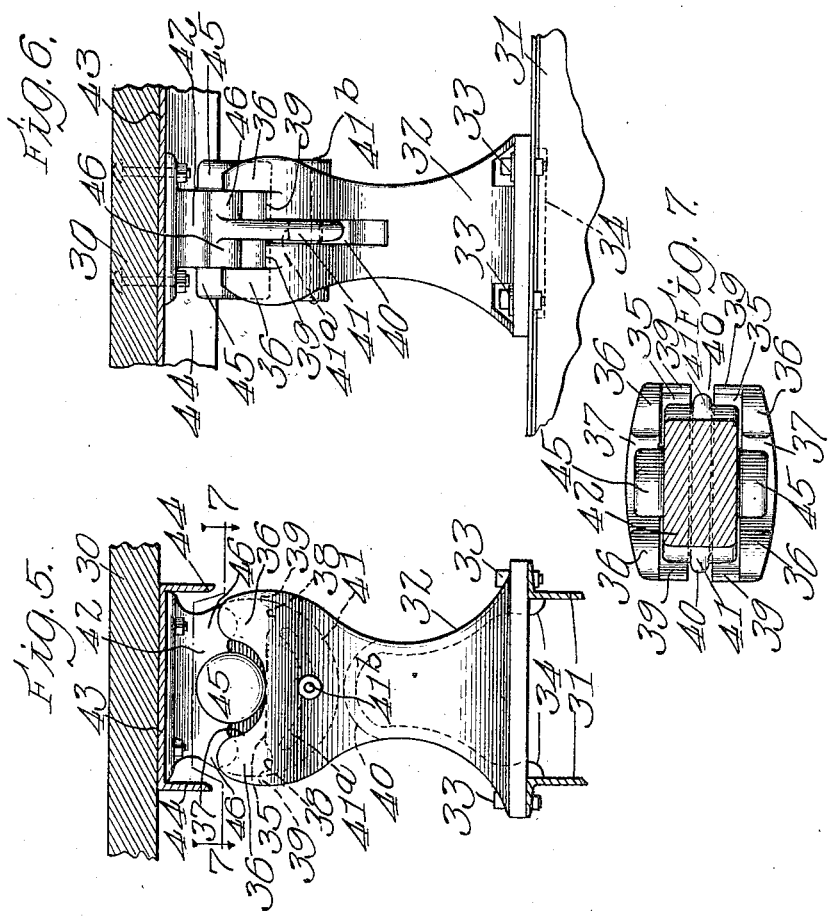

UNITED STATES PATENT OFFICE.

HOWARD GREER, JR., OF EVANSTON, ILLINOIS, ASSIGNOR TO CARTER H. FITZ-HUGH AND FREDERICK P. LUTHER, OF CHICAGO, ILLINOIS.

DUMPING-CAR.

1,125,307. Specification of Letters Patent. Patented Jan. 19, 1915.

Original application filed November 14, 1910, Serial No. 592,167. Divided and this application filed August 9, 1912. Serial No. 714,179.

*To all whom it may concern:*

Be it known that I, HOWARD GREER, Jr., a citizen of the United States, residing at Evanston, in the county of Cook and State of Illinois, have invented certain new and useful Improvements in Dumping-Cars, of which the following is a specification.

This application is a division of my original application, Serial No. 592,167, filed in the United States Patent Office on or about November 14th, 1910, and to which application reference may be had for an understanding of the construction and operation of the parts not fully described herein.

This invention relates to improvements in dumping cars, in which the wheel journal boxes are located on the inside of the wheels and in position so that they will not engage any obstructions and so that they will not be embedded in the material dumped to the side of the car, and one of the objects of the invention is to provide an improved construction of car body pedestal which will facilitate the dumping of the car and which, with the arrangement of the inside wheel journal boxes, will increase to a maximum the angle of dump of the car.

To the attainment of these ends and the accomplishment of other new and useful objects, as will appear, the invention consists in the features of novelty, in substantially the construction, combination and arrangement of the several parts hereinafter more fully described and claimed, and shown in the accompanying drawings illustrating an embodiment of the invention, and in which—

Figure 1 is a top plan view of an improved car truck constructed in accordance with the principles of this invention. Fig. 2 is an end elevation of a car constructed in accordance with the principles of this invention, showing the car body in position to receive a load. Fig. 3 is a detail view partly in elevation and partly in section, showing the bumper on the car bolster and the bumper plate which is secured to the bottom of the car body, the latter being in section. Fig. 4 is an enlarged detail view, partly in elevation, partly in section, and partly broken away, and with parts omitted, showing a car bolster and pedestal constructed in accordance with the principles of this invention. Fig. 5 is an enlarged side elevation of the car body pedestal, showing parts of the support and car body in section. Fig. 6 is an end elevation of Fig. 5, showing a portion of the car body in section. Fig. 7 is a detail sectional view on line 7—7 of Fig. 6.

Referring more particularly to the drawings, and in the present exemplification of this invention, the numeral 20 designates the arch bars forming the sides of the truck which support the journals 21 for the axles 22 of the wheels 23. These journals 21 are located on the inside of the wheels of the truck so that there will be no projection extending beyond the outer faces of the wheels. The springs 24 of the truck bolster 25 (see particularly Fig. 4) rest upon the spring seat 26 and the bolster rests upon the top of these springs in the ordinary and usual manner, to be guided by the bars or columns 27. The truck bolster is of any desired construction, but is preferably of channel iron formation having a center plate 28 secured thereto and which center plate is provided with the usual opening for the king pin. The usual truck side bearings 29 are provided on the bolster 25 adjacent the ends thereof.

The car body 30 is supported by the sills 31 by means of pedestals, each comprising a supporting section 32 which latter rests upon the top of the sill members 31 and are secured thereto in any suitable manner, preferably by means of fastening devices 33 in the form of bolts or the like, which pass through the base of the pedestal and a flange on the sill members. Each of the pedestals may also be provided with a projecting ear or rib 34 depending below the lower face of the base thereof and inside of the sill members 31 to engage the faces thereof to assist in holding the pedestal against lateral displacement with respect to the sill members.

Supporting section 32 of the pedestal may be of any desired height and is provided at its upper end with a recessed portion 35 to form upwardly projecting spaced flanges 36 and these flanges are each provided with a centrally disposed recess 37 opening through the tops of the flanges. The bottom of the recesses 37 terminate in substantially the same plane as the bottom of the recessed portion 35. The bottom of the recesses 35 between the flanges 36 is further provided with recesses 38 extending below the bottom 35 to form projections 39, which latter are located adjacent the edges of the flange 36 and project above the bottom of the recess 35. The recess 38 and the projections 39 are both located within the plane of the respective edges formed by the flanges 36 and the respective walls of the recess 37. The supporting section 32 of the pedestal is also provided with a recess 40 which opens through the bottom of the recess 35 and also through the upwardly projecting portions 39. This recess 40 is preferably disposed midway between the flanges 36 and is adapted to receive a web or flange 41 on an oscillating section 42 of the pedestal. This section 42 is secured to the bottom 30 of the car in any suitable manner, preferably by being secured to the angle truss bar 43 between the flanges 44 of the bar. The section 42 of the pedestal is provided with laterally projecting portions 45 which are of cylindrical construction to form trunnions. These trunnions 45 are adapted to rest upon the bottoms of the recesses 37 in the flanges 36 and are of a diameter somewhat smaller than the recesses, so that the oscillating section 42 may be rocked upon the supporting section 32, the trunnions 45 rotated and rolling in the recesses 37 to permit such oscillation. These trunnions 45 are preferably centrally disposed with respect to the edges of the web 41. Shoulders 46 are provided on the section 42 which extend over and are normally spaced above the respective recesses 38 in the bottom of the recess 35, when the car body 30 is held in a substantially horizontal position, but when the car body is rocked on the trunnions 45 to oscillate the section 42, one pair of shoulders will be lowered toward the respective recesses 38, while the car body is rocking about the trunnion 45. As this rocking movement is imparted to the car body, the trunnion 45 will travel toward the wall of the recess 37 on the side toward which the car is being dumped. By the time the trunnions 45 reach a position in close proximity to the walls of the recess 37, the shoulders 46 which are being lowered will be moved in close proximity to the recesses 38. This motion will be imparted to the car body by throwing the latter out of balance and by the time the shoulders 46 enter the recesses 38, the inertia of the car body will complete the dumping, and the shoulders or projections 39 will hold the parts against displacement. In order to provide an additional means for preventing the inertia caused by the dumping movement of the car body from throwing the car body too far over to the side, which would cause disengagement of the parts, the web 41 is provided with a slot or opening 41ª and a pin or fastening device 41ᵇ is provided which extends through the walls of the pedestal and also through the slot 41ª. This pin or fastening bolt is held against longitudinal displacement in any suitable manner and for this purpose the ends of the bolt or pin may be headed or may be threaded to receive nuts. The slot 41ª is curved or struck on an arc so that the pin 41ᵇ will not interfere with the free rocking or dumping movement of the car body, as will be understood. After the car has been dumped, the car body 30 may be swung about the trunnions 45 in the opposite direction until it assumes a position to be again loaded. Cars of this general type are generally loaded with the weight on one side, that is, on the side to which the car is to be dumped, and are held against accidental dumping by means of the anchor chains 47 which latter are secured by one of their extremities to the car body and by their other extremities to the truck. The anchor chains, however, and the manner in which they are secured to the car truck form no part of the present invention, but constitute a portion of the subject matter of another application. The web 41 is provided for maintaining the oscillating sections 42 against lateral displacement with respect to the supporting section 32 when the car body is in motion or when a sudden movement is imparted to the car trucks. Any number of these pedestals may be employed according to the size and capacity of the car and are of such height that when the car is dumped the maximum angle of dump will be obtained and by the provision of the inside truck journals, this angle of dump will be substantially 49 degrees, or several degrees greater than the maximum angle of dump heretofore obtained in cars of this character. It will also be apparent that by the arrangement of the journals inside of the wheels, the journal boxes will not be embedded or buried in the material dumped from the car, which latter would form obstructions to the advancement of the car and through which the journal boxes would have to be moved before the car could be advanced or the material dumped would have to be removed from around the journal boxes in order to clear the latter.

The body bolster is preferably constructed with a base designated generally by the reference numeral 48 having arms or portions 49 which terminate short of each other, as shown more clearly in Fig. 4, and a top member 50 which is arched, as shown, so that the body bolster will be of substantially triangular formation. The sills 31 of the car project into the space between adjacent extremities of the arms 49 of the bolster and the upper member 50 arches over the sill members, and the arch member is of a height to extend for some distance above the base of the pedestal. The free extremity of each arm 49 is secured to the sills 31 in any suitable manner, preferably by fastening devices 51ª passing through the sill members and flanged portions of the arms, and a center plate 51 having a king pin guide 52 is secured to the arms across the sills and below the latter. The guide 52 in the center plate 51 registers with the opening in the center plate 28 of the truck bolster 25 and the king pin 53 is passed through the guide 52 and the opening in the plate 28. If desired, additional arms 52ª may be provided, which extend from the inner face of the arched member 50 and engage the sill members 31, and these arms may be secured to the sill members by fastening devices similar to the fastening devices 51ª. With this improved construction of body bolster, it will be apparent that the maximum strength will be obtained from a given amount of material, and by extending the arched member for some distance above the base of the pedestals and over the sill members, all tendency of the parts to twist and thereby wrench parts will be overcome. The body bolsters are provided with sockets 54 (see Fig. 4) for the reception of cushions or bumpers 55, and the sockets 54 are provided with apertures 56 opening through the bottom thereof and through which apertures any water which may have found its way into the recesses may be discharged. The side bearings 29 on the truck bolster 25 for the body bolster 50 are also located within the planes of the outer faces of the wheels 23 of the truck. With the bearings thus arranged and with the journals 21 on the inside of the wheels, when the body is brought into engagement with one or the other of the bearings 29, the stress thus exerted on one end of the truck bolster 25 will tend to force the opposite side of the truck downwardly, and thereby maintain the wheels of the truck on the opposite side of the car into engagement with the track.

Bumper plates 57 may be provided if desired and when provided may be secured to the bottom of the car body 30 so that they will engage the bumpers 55 when the car is dumped.

What is claimed as new is:

1. A pedestal for car bodies and the like comprising a support having a recess in its top, an oscillatory member pivoted to said support and having a projection extending into said recess, there being a slot in said projection, and a pin carried by said support, disposed through said slot and limiting the pivotal movement of the oscillatory member.

2. A pedestal for car bodies and the like comprising a supporting member provided with a recess opening through its upper face, said recess being also provided with open ends, each of the walls of the said recess being also provided with a recess opening through the top thereof and having communication with the first said recess, an oscillating member projecting into the first recited recess, and trunnions on the said member projecting into the recesses in the walls of the first recited recess and being of a diameter less than the size of the recesses into which they project.

3. A pedestal for car bodies and the like comprising a supporting member provided with a recess opening through its upper face, said recess being also provided with open ends, each of the walls of said recess being also provided with a recess opening through the top thereof and having communication with the first said recess, an oscillating member projecting into the first recited recess, trunnions on the said members projecting into the recesses in the walls of the first recited recess and being of a diameter less than the size of the recesses into which they project, and shoulders on the said oscillating member on each side of the respective trunnions adapted to engage the base of the first recited recess.

4. A pedestal for car bodies and the like comprising a supporting member provided with a recess opening through its upper face, said recess being also provided with open ends, each of the walls of said recess being also provided with a recess opening through the top thereof and having communication with the first said recess, an oscillating member projecting into the first recited recess, trunnions on the said member projecting into the recesses in the walls of the first recited recess and being of a diameter less than the size of the recesses into which they project, and shoulders on the said oscillating members on each side of the respective trunnions spaced above and adapted to be brought into engagement with the base of the first recited recess, portions of said base beyond the points at which the said shoulders engage therewith projecting beyond the plane of the upper face of the base of the recess.

5. A pedestal for car bodies and the like comprising a supporting member provided with a recess opening through its upper face, said recess being also provided with open ends, each of the walls of said recess being also provided with a recess opening through the top thereof and having communication with the first said recess, an oscillating member projecting into the first recited recess and having trunnions of a diameter less than the size of the second recited recesses into which they project, shoulders on the said oscillating member on each side of the respective trunnions and spaced above and adapted to be brought into engagement with the base of the first recited recess, portions of said base beyond the points at which the said shoulders engage therewith projecting beyond the plane of the upper face of the base of the recess, and recesses in the said base adapted to receive the respective shoulders.

6. A pedestal for car bodies and the like comprising a supporting member having a recess opening through the upper face thereof, said recess being open at its ends, the extremities of the base of the recess adjacent the said open ends being raised above the plane of the face of the base and said base being also provided with recesses opening through its upper face and adjacent the said raised portions, the side walls of the recess being also provided with recesses opening through the tops thereof, an oscillating member, laterally projecting trunnions on the member adapted to enter the respective recesses in the walls of the first recited recess and being of a diameter somewhat smaller than the size of the receiving recesses whereby the trunnions will be capable of rolling movement upon the pedestal, and means coöperating with the said projections and the recesses in the base of the first recited recess for controlling the said rolling movement.

7. A pedestal for car bodies and the like comprising a supporting member having a recess opening through the upper face thereof, said recess being open at its ends, the extremities of the base of the recess adjacent the said open ends being raised above the plane of the face of the base and said base being also provided with recesses opening through its upper face and adjacent the said raised portions, the side walls of the recess being also provided with recesses opening through the tops thereof, an oscillating member, laterally projecting trunnions on the member adapted to enter the respective recesses in the walls of the first recited recess and being of a diameter somewhat smaller than the size of the receiving recesses whereby the trunnions will be capable of rolling movement upon the pedestal, and shoulders on said oscillating member and disposed on each side of the trunnions and spaced above the base of the first recited recess, said shoulders coöperating with the said projections on and recesses in the base of the recess for controlling such rolling movement.

8. A pedestal for car bodies and the like comprising a supporting member having a recess opening through the upper face thereof, said recess being open at its ends, the extremities of the base of the recess adjacent the said open ends being raised above the plane of the face of the base and said base being also provided with recesses opening through its upper face and adjacent the said raised portions, the side walls of the recess being also provided with recesses opening through the top thereof, an oscillating member, laterally projecting trunnions on the member adapted to enter the respective recesses in the walls of the first recited recess and being of a diameter somewhat smaller than the size of the receiving recesses, whereby the trunnions will be capable of rolling movement upon the pedestal, and means coöperating with the said projections and the recesses in the base of the first recited recess for controlling the said rolling movement, a portion of the said oscillating member projecting into the body of the pedestal below the said recesses for holding the parts against lateral displacement.

9. A pedestal for car bodies and the like comprising a supporting member having a recess opening through the upper face thereof, said recess being open at its ends, the extremities of the base of the recess adjacent the said open ends being raised above the plane of the face of the base and said base being also provided with recesses opening through its upper face and adjacent the said raised portions, the side walls of the recess being also provided with recesses opening through the top thereof, an oscillating member, laterally projecting trunnions on the members adapted to enter the respective recesses in the walls of the first recited recess and being of a diameter somewhat smaller than the size of the receiving recesses, whereby the trunnions will be capable of rolling movement upon the pedestal, and means coöperating with the said projections and the recesses in the base of the first recited recess for controlling the said rolling movement, said pedestal being also provided with another recess in its body below the base of and opening into the first said recess and into which a portion of the said oscillating member projects.

10. A pedestal for car bodies and the like comprising a supporting member provided with a recess opening through the top thereof, the side walls of the recess being also provided with recesses opening through their top edges, an oscillating member projecting into the first recited recess, trunnions on the oscillating member projecting into the recesses in the said walls and being of a diameter somewhat smaller than the size of the recesses whereby said oscillating member will have a rolling engagement with the supporting members, and means for limiting such rolling movement, the last recited means also acting as a pivot about which the oscillating member moves.

11. A pedestal for car bodies and the like comprising a supporting member provided with a recess opening through the top thereof, the side walls of the recess being also provided with recesses opening through their top edges, an oscillating member projecting into the first recited recess, trunnions on the oscillating member projecting into the recesses in the said walls and being of a diameter somewhat smaller than the size of the recesses whereby said oscillating member will have a rolling engagement with the supporting member, means for limiting such rolling movement, the last recited means also acting as a pivot about which the oscillating member moves, and means for preventing lateral displacement of the parts.

12. A pedestal for car bodies and the like comprising a supporting member provided with a recess opening through the top thereof, the side walls of the recess being also provided with recesses opening through their top edges, an oscillating member projecting into the first recited recess, trunnions on the oscillating member projecting into the recesses in the said walls and being of a diameter somewhat smaller than the size of the recesses whereby said oscillating member will have a rolling engagement with the supporting member, and means for limiting such rolling movement, the last recited means also acting as a pivot about which the oscillating member moves, a portion of the oscillating member projecting beyond the first said recess and into the body of the supporting member.

13. A pedestal for car bodies and the like comprising a supporting member provided with a recess opening through the top thereof, the side walls of the recess being also provided with recesses opening through their top edges, an oscillating member projecting into the first recited recess, trunnions on the oscillating member projecting into the recesses in the said walls and being of a diameter somewhat smaller than the size of the recesses whereby said oscillating member will have a rolling adjustment with the supporting member, and shoulders on the said oscillating member normally spaced above and adapted to be brought into engagement with the base of the first recited recess to form another pivot about which the oscillating member is adapted to move.

14. A pedestal for car bodies and the like comprising a supporting member provided with a recess opening through the top thereof, the side walls of the recess being also provided with recesses opening through their top edges, an oscillating member projecting into the first recited recess, trunnions on the oscillating member projecting into the recesses in the said walls and being of a diameter somewhat smaller than the size of the recesses whereby said oscillating member will have a rolling engagement with the supporting member, shoulders on the said oscillating member normally spaced above the bottom of the first recited recesses, and recesses opening through the bottom of the last said recess and adapted to receive the respective shoulders to form an additional pivot about which the oscillatory member is adapted to move.

15. A pedestal for car bodies and the like comprising a supporting member provided with a recess opening through the top thereof, the side walls of the recess being also provided with recesses opening through their top edges, an oscillatory member projecting into the first recited recess, trunnions on the oscillatory member projecting into the recesses in the said walls and being of a diameter somewhat smaller than the size of the recesses whereby said oscillating member will have a rolling engagement with the supporting member, shoulders on the said oscillating member normally spaced above and adapted to be brought into engagement with the base of the first recited recess to form another pivot about which the oscillating member is adapted to move, and a web projecting from the oscillating member and projecting into the pedestal below the first said recess.

16. A pedestal for car bodies and the like comprising a support having a recess in its top, an oscillatory member pivoted to said support and having a projection extending into said recess, there being a curved slot in said projection, and a pin carried by said support, disposed through said slot and adapted to engage the ends of the latter to limit the pivotal movement of the oscillatory member.

17. A pedestal for car bodies and the like comprising a support having a recess extending downwardly therein, an oscillatory member having trunnions thereon rollingly engaging the support and providing a shifting pivotal connection for the oscillatory member; a projection on said oscillatory member extending into said recess, there being a slot in said projection disposed in a curve conforming with the portion of the projection traveling by a point on said support during the oscillation of the oscillatory member, and a pin carried by said support and extending through said slot, adapted to engage the ends of the latter and limit the pivotal movement of the oscillatory member.

18. A pedestal for car bodies and the like comprising a support and having a curved recess in its upper side, an oscillatory member having a trunnion thereon with a curved supporting surface of a smaller diameter than the curve of said recess and engaging the latter to provide a shifting pivotal connection for the oscillatory member, a projection on said oscillatory member and extending below said curved recess, there being a slot in said projection disposed in a curve described by a point on said support during the movement of the projection by said point upon oscillation of the oscillatory member, and means carried by the support at said point and disposed in said slot adapted to engage the ends of the latter to limit the pivotal movement of the oscillatory member.

In testimony whereof I have signed my name to this specification, in the presence of two subscribing witnesses, on this 6 day of August A. D. 1912.

HOWARD GREER, Jr.

Witnesses:
M. W. PLATT,
O. J. HALL.

Copies of this patent may be obtained for five cents each, by addressing the "Commissioner of Patents, Washington, D. C."